United States Patent
Bultje et al.

(10) Patent No.: US 9,392,288 B2
(45) Date of Patent: Jul. 12, 2016

(54) VIDEO CODING USING SCATTER-BASED SCAN TABLES

(71) Applicant: Google Inc., Mountain View, CA (US)

(72) Inventors: Ronald Sebastiaan Bultje, San Jose, CA (US); Christian Luc Duvivier, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 267 days.

(21) Appl. No.: 14/056,331

(22) Filed: Oct. 17, 2013

(65) Prior Publication Data
US 2015/0110173 A1   Apr. 23, 2015

(51) Int. Cl.
| H04N 7/12 | (2006.01) |
| H04N 19/136 | (2014.01) |
| H04N 19/61 | (2014.01) |
| H04N 19/40 | (2014.01) |
| H04N 21/43 | (2011.01) |
| H04N 19/129 | (2014.01) |

(Continued)

(52) U.S. Cl.
CPC ......... *H04N 19/136* (2014.11); *H04N 7/26941* (2013.01); *H04N 7/30* (2013.01); *H04N 7/50* (2013.01); *H04N 19/129* (2014.11); *H04N 19/176* (2014.11); *H04N 21/4305* (2013.01); *H04N 7/26244* (2013.01); *H04N 19/60* (2014.11); *H04N 19/61* (2014.11)

(58) Field of Classification Search
CPC . H04N 7/50; H04N 7/26941; H04N 21/4305; H04N 7/30; H04N 7/26244
See application file for complete search history.

(56) References Cited

U.S. PATENT DOCUMENTS

| 4,710,810 A | 12/1987 | Koga |
| 5,016,010 A | 5/1991 | Sugiyama |

(Continued)

FOREIGN PATENT DOCUMENTS

| CN | 1741616 A | 3/2006 |
| CN | 101039430 A | 9/2007 |

(Continued)

OTHER PUBLICATIONS

Auyeung C. et al.:"parallel processing friendly simplified context selection of significance map", 4.JCT-VC Meeting; 95. MPEG Meeting; Jan. 20, 2011-Jan. 28, 2011; Daegu; (Joint Collaborative Team on Video Coding of IS/IEC JTC1/SC29/WG11 and ITU-T SG.16); URL:http://wftp3.itu.int/AV-ARCH/JCTVC-SITE/, No. JCTVC-D260, Jan. 16, 2011, all pages.

(Continued)

*Primary Examiner* — Shawn An
(74) *Attorney, Agent, or Firm* — Young Basile Hanlon & MacFarlane, P.C.

(57) ABSTRACT

Scatter-based scan tables are used to encode and decode video streams. Scatter scan patterns transform coefficients between positions within a 2D array representing a block of a frame and positions within a 1D array for further encoding. By calculating a probability of whether a transform coefficient at a given position in a 2D array is non-zero, a scan order of the 2D array may be defined by a 1D array that groups the values most likely to be zero at the end of the 1D array for removal from a subsequent encoding process. This can reduce the amount of data in an encoded video stream. A decoder can use the same scatter scan pattern to rearrange a sequence of encoded transform coefficients in a 1D array into a 2D array for further decoding of an encoded block.

20 Claims, 16 Drawing Sheets

(51) Int. Cl.
  *H04N 19/60* (2014.01)
  *H04N 19/176* (2014.01)

(56) References Cited

U.S. PATENT DOCUMENTS

| | | | |
|---|---|---|---|
| 5,150,209 A | 9/1992 | Baker et al. |
| 5,260,783 A | 11/1993 | Dixit |
| 5,461,423 A | 10/1995 | Tsukagoshi |
| 5,650,782 A | 7/1997 | Kim |
| 5,686,962 A | 11/1997 | Chung et al. |
| 5,708,473 A | 1/1998 | Mead |
| 5,767,909 A | 6/1998 | Jung |
| 5,777,680 A | 7/1998 | Kim |
| 5,818,536 A | 10/1998 | Morris et al. |
| 5,886,652 A | 3/1999 | Adachi et al. |
| 6,125,144 A | 9/2000 | Matsumura et al. |
| 6,157,326 A | 12/2000 | Van Der Vleuten et al. |
| 6,212,234 B1 | 4/2001 | Andoh et al. |
| 6,256,423 B1 | 7/2001 | Krishnamurthy et al. |
| 6,314,208 B1 | 11/2001 | Konstantinides et al. |
| 6,414,995 B2 | 7/2002 | Okumura et al. |
| 6,418,166 B1 | 7/2002 | Wu et al. |
| 6,434,197 B1 | 8/2002 | Wang et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,570,924 B1 | 5/2003 | Lynch et al. |
| 6,661,842 B1 | 12/2003 | Abousleman |
| 6,661,925 B1 | 12/2003 | Pianykh et al. |
| 6,856,701 B2 | 2/2005 | Karczewicz et al. |
| 6,907,079 B2 | 6/2005 | Gomila et al. |
| 6,917,651 B1 | 7/2005 | Yoo et al. |
| 6,985,527 B2 | 1/2006 | Gunter et al. |
| 7,010,032 B1 | 3/2006 | Kikuchi et al. |
| 7,085,425 B2 | 8/2006 | Christopoulos et al. |
| 7,116,831 B2 | 10/2006 | Mukerjee et al. |
| 7,226,150 B2 | 6/2007 | Yoshimura et al. |
| 7,432,329 B2 | 10/2008 | Haubennestel et al. |
| 7,496,143 B2 | 2/2009 | Schwarz et al. |
| 7,843,998 B2 | 11/2010 | Bjontegaard |
| 8,064,527 B2 | 11/2011 | Liu et al. |
| 8,116,373 B2 | 2/2012 | Base et al. |
| 8,200,033 B2 | 6/2012 | Mietens et al. |
| 8,254,700 B1 | 8/2012 | Rastogi |
| 8,265,162 B2 | 9/2012 | Tian et al. |
| 8,270,738 B2 | 9/2012 | Raveendran et al. |
| 8,311,119 B2 | 11/2012 | Srinivasan |
| 8,331,444 B2 | 12/2012 | Karczewicz et al. |
| 8,344,917 B2 | 1/2013 | Misra et al. |
| 8,374,445 B2 | 2/2013 | Benndorf |
| 8,401,083 B2 | 3/2013 | Crotty et al. |
| 8,938,001 B1 | 1/2015 | Bankoski et al. |
| 2001/0022815 A1 | 9/2001 | Agarwal |
| 2002/0009153 A1 | 1/2002 | Jeon et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2003/0081850 A1 | 5/2003 | Karczewicz et al. |
| 2003/0128886 A1 | 7/2003 | Said |
| 2003/0215018 A1 | 11/2003 | MacInnis et al. |
| 2003/0227972 A1 | 12/2003 | Fukuda |
| 2004/0013308 A1 | 1/2004 | Jeon et al. |
| 2004/0120398 A1 | 6/2004 | Zhang et al. |
| 2004/0131117 A1 | 7/2004 | Sheraizin et al. |
| 2004/0151252 A1 | 8/2004 | Sekiguchi et al. |
| 2004/0234144 A1 | 11/2004 | Sugimoto et al. |
| 2005/0123207 A1* | 6/2005 | Marpe ............ H04N 19/196 382/239 |
| 2005/0152459 A1 | 7/2005 | Lobo et al. |
| 2005/0180500 A1 | 8/2005 | Chiang et al. |
| 2005/0201470 A1 | 9/2005 | Sievers |
| 2005/0276323 A1 | 12/2005 | Martemyanov et al. |
| 2005/0276333 A1 | 12/2005 | Park |
| 2006/0001557 A1 | 1/2006 | Liao |
| 2006/0098738 A1 | 5/2006 | Cosman et al. |
| 2006/0126724 A1 | 6/2006 | Cote et al. |
| 2006/0203916 A1 | 9/2006 | Chandramouly et al. |
| 2007/0025441 A1 | 2/2007 | Ugur et al. |
| 2007/0127831 A1 | 6/2007 | Venkataraman |
| 2007/0136742 A1 | 6/2007 | Sparrell |
| 2007/0177673 A1 | 8/2007 | Yang |
| 2008/0013633 A1 | 1/2008 | Ye et al. |
| 2008/0170615 A1 | 7/2008 | Sekiguchi et al. |
| 2008/0181299 A1 | 7/2008 | Tian et al. |
| 2008/0310503 A1 | 12/2008 | Lee et al. |
| 2008/0310745 A1 | 12/2008 | Ye et al. |
| 2009/0175332 A1 | 7/2009 | Karczewicz et al. |
| 2009/0190659 A1 | 7/2009 | Lee et al. |
| 2010/0054328 A1 | 3/2010 | Nozawa |
| 2010/0097250 A1 | 4/2010 | Demircin et al. |
| 2010/0098169 A1 | 4/2010 | Budagavi |
| 2010/0290568 A1 | 11/2010 | Suzuki et al. |
| 2011/0080946 A1 | 4/2011 | Li et al. |
| 2011/0243225 A1 | 10/2011 | Min et al. |
| 2012/0020408 A1 | 1/2012 | Chen et al. |
| 2012/0082220 A1 | 4/2012 | Mazurenko et al. |
| 2012/0140822 A1 | 6/2012 | Wang et al. |
| 2012/0147948 A1 | 6/2012 | Sole et al. |
| 2012/0183052 A1 | 7/2012 | Lou et al. |
| 2012/0207222 A1 | 8/2012 | Lou et al. |
| 2012/0236931 A1 | 9/2012 | Karczewicz et al. |
| 2012/0243605 A1 | 9/2012 | Turlikov et al. |
| 2012/0320978 A1 | 12/2012 | Ameres et al. |
| 2012/0328026 A1 | 12/2012 | Sole Rojals et al. |
| 2013/0003829 A1 | 1/2013 | Misra et al. |
| 2013/0003835 A1* | 1/2013 | Sole Rojals ........... H04N 19/196 375/240.12 |
| 2013/0027230 A1 | 1/2013 | Marpe et al. |
| 2013/0114692 A1* | 5/2013 | Sze ...................... H04N 19/176 375/240.03 |
| 2014/0177708 A1 | 6/2014 | Alshin et al. |
| 2015/0110409 A1 | 4/2015 | Bultje et al. |

FOREIGN PATENT DOCUMENTS

| | | |
|---|---|---|
| EP | 1351510 | 10/2003 |
| EP | 1768415 A1 | 3/2007 |
| EP | 2235950 | 10/2010 |
| EP | 2677750 A1 | 12/2013 |
| JP | 61092073 | 5/1986 |
| JP | 2217088 | 8/1990 |
| JP | 2272970 | 11/1990 |
| JP | 8280032 | 10/1996 |
| JP | 09247682 | 9/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| JP | 2006033148 A | 2/2006 |
| KR | 100213018 | 8/1999 |
| KR | 200130916 | 4/2001 |
| WO | WO0150770 | 7/2001 |
| WO | WO03026315 | 3/2003 |
| WO | WO2009091279 A1 | 7/2009 |
| WO | WO2012119463 A1 | 9/2012 |

OTHER PUBLICATIONS

Canadian Office Action in CA2810899, related to U.S. Appl. No. 13/253,385, mailed Jan. 25, 2015.
Chenjie Tu et al., "Context-Based Entropy of Block Transform Coefficients for Image Compression" IEEE 11, No. 11, Nov. 1, 2002, pp. 1271-1283.
ISR & Written Opinion in Application # PCT/US2012/024608; mailed Jun. 5, 2012.
ISR and Written Opinion of the International Searching Authority, for Int'l Application No. PCT/US2012/020707; Feb. 15, 2012, 15 pages.
J-R Ohm, et al., "Report of the 4th JCT-VC Meeting", JCT-VC Meeting, Jan. 24, 2011.
Lou J, et al., "On Context Selection for Significant_Coeff_Flag Coding", 96. MPEG Meeting Mar. 21-Mar. 25, 2011, JCTVC-E362.

(56) References Cited

OTHER PUBLICATIONS

Lou, Jian, et al., "Parallel Processing Friendly Context Modeling for Significance Map Coding in CABAC", 4.JCT-VC Meeting; 95. MPEG Meeting; Jan. 20, 2011-Jan. 28, 2011; Daegu; (Joint Collaborative Team on Video Coding of IS/IEC JTC1/SC29/WG11 and ITU-T SG.16); URL:http://wftp3.itu.int/AV-ARCH/JCTVC-SITE/, No. JCTVC-D241, Jan. 19, 2011, all pages.
Marpe et al., Context-Based Adaptive Binary Arithmetic Coding in the H.264/AVC Video Compression Standard, Detlev marpe, IEEE Transactions on Circuits and Systems for Video Technology, vol. 13, No. 7, Jul. 2003, 17 pages.
Richardson, "H.264/MPEG-4 Part 10: Introduction to CABAC," Oct. 17, 2002.
Sole, et al., Parallel Context Processing for the significance map in high coding efficiency. Joel Sole, JCTVC_D262, ver 1, 2011-01016.
Sze V, et al.,"CE11: Simplified context selection for significan t_coeff_flag (JCTVC-C227)", JCT_VC Meeting, Jan. 15, 2011.
Vadim Seregin, et al., "Low-Complexity Adaptive Coefficients Scanning", Joint Collaborative Team on Video Coding (JCT-VC) of ITU-T SG16 WP3 and ISO/IEC JTC1/SC29 WG11, vol. JCTCV-C205, Oct. 2, 2010, all pages.
Wiegand, et al., Overview of th H.264/AVC Video Coding Standard, IEEE Transactions on Circuits and Systems for Video Technology, p. 1-19, Jul. 2003.
Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.
Winken (Fraunhofer HHI) M. et al., "Description of Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); JCTVC-A116, URL:http://wftp3.itu.int/AV-ARCH/JCTVC-SITE/, No. 24 Apr. 2010, all pages.
Park, Jun Sung, et al., "Selective Intra Prediction Mode Decision for H.264/AVC Encoders", World Academy of Science, Engineering and Technology 13, (2006).
Wiegand, Thomas, Study of Final Committee Draft of Joint Video Specification (ITU-T Rec. H264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, An Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.

\* cited by examiner

700

| C00 | C01 | C02 | C03 |
|---|---|---|---|
| C10 | C11 | C12 | C13 |
| C20 | C21 | C22 | C23 |
| C30 | C31 | C32 | C33 |

| 1 | 2 | 6 | 7 |
|---|---|---|---|
| 3 | 5 | 8 | 13 |
| 4 | 9 | 12 | 14 |
| 10 | 11 | 15 | 16 |

| 1 | 5 | 9 | 13 |
|---|---|---|---|
| 2 | 6 | 10 | 14 |
| 3 | 7 | 11 | 15 |
| 4 | 8 | 12 | 16 |

| 64% | 40% | 26% | 19% |
|---|---|---|---|
| 44% | 30% | 19% | 14% |
| 30% | 21% | 15% | 10% |
| 22% | 15% | 10% | 8% |

FIG. 8A

| 64% | 44% | 40% | 30% | 30% | 26% | 22% | 21% | 19% | 19% | 15% | 15% | 14% | 10% | 10% | 8% |
|---|---|---|---|---|---|---|---|---|---|---|---|---|---|---|---|

| 1 | 5 | 2 | 6 | 9 | 3 | 13 | 10 | 4 | 7 | 14 | 11 | 8 | 15 | 12 | 16 |
|---|---|---|---|---|---|---|---|---|---|---|---|---|---|---|---|

| 1 | 5 | 2 | 6 |
|---|---|---|---|
| 9 | 3 | 13 | 10 |
| 4 | 7 | 14 | 11 |
| 8 | 15 | 12 | 16 |

FIG. 8D

| 71% | 56% | 40% | 28% |
|---|---|---|---|
| 42% | 32% | 21% | 15% |
| 20% | 16% | 11% | 8% |
| 12% | 9% | 6% | 4% |

| 71% | 56% | 42% | 40% | 32% | 28% | 21% | 20% | 16% | 15% | 12% | 11% | 9% | 8% | 6% | 4% |
|---|---|---|---|---|---|---|---|---|---|---|---|---|---|---|---|

| 1 | 2 | 5 | 3 | 6 | 4 | 7 | 9 | 10 | 8 | 13 | 11 | 14 | 12 | 15 | 16 |
|---|---|---|---|---|---|---|---|---|---|---|---|---|---|---|---|

|     |     |     |    |
|-----|-----|-----|----|
| 71% | 37% | 15% | 8% |
| 56% | 30% | 13% | 7% |
| 43% | 21% | 9%  | 5% |
| 30% | 14% | 6%  | 3% |

| 71% | 56% | 43% | 37% | 30% | 30% | 21% | 15% | 14% | 13% | 9% | 8% | 7% | 6% | 5% | 3% |

| 1 | 5 | 9 | 2 | 13 | 6 | 10 | 3 | 14 | 7 | 11 | 4 | 8 | 15 | 12 | 16 |

| 71% | 43% | 26% | 15% | 9% | 5% | 2% | 1% |
|---|---|---|---|---|---|---|---|
| 48% | 31% | 19% | 11% | 6% | 3% | 1% | 1% |
| 31% | 21% | 14% | 8% | 4% | 2% | 1% | 0% |
| 19% | 13% | 9% | 5% | 3% | 1% | 0% | 0% |
| 12% | 8% | 5% | 3% | 2% | 1% | 0% | 0% |
| 7% | 4% | 3% | 2% | 1% | 0% | 0% | 0% |
| 4% | 2% | 1% | 1% | 0% | 0% | 0% | 0% |
| 2% | 1% | 1% | 0% | 0% | 0% | 0% | 0% |

*FIG. 11*

| 74% | 58% | 47% | 34% | 25% | 16% | 9% | 5% |
|---|---|---|---|---|---|---|---|
| 44% | 35% | 26% | 18% | 12% | 7% | 3% | 1% |
| 28% | 21% | 16% | 11% | 7% | 4% | 2% | 1% |
| 17% | 13% | 9% | 6% | 4% | 2% | 1% | 0% |
| 9% | 7% | 5% | 3% | 2% | 1% | 0% | 0% |
| 5% | 3% | 2% | 1% | 1% | 0% | 0% | 0% |
| 2% | 2% | 1% | 0% | 0% | 0% | 0% | 0% |
| 1% | 1% | 0% | 0% | 0% | 0% | 0% | 0% |

*FIG. 12*

| 75% | 44% | 25% | 13% | 7% | 2% | 1% | 0% |
|---|---|---|---|---|---|---|---|
| 62% | 36% | 20% | 10% | 5% | 2% | 0% | 0% |
| 53% | 30% | 16% | 8% | 4% | 1% | 0% | 0% |
| 42% | 23% | 12% | 6% | 2% | 1% | 0% | 0% |
| 32% | 17% | 8% | 4% | 2% | 0% | 0% | 0% |
| 24% | 10% | 5% | 2% | 1% | 0% | 0% | 0% |
| 15% | 6% | 3% | 1% | 0% | 0% | 0% | 0% |
| 9% | 3% | 1% | 1% | 0% | 0% | 0% | 0% |

| 1 | 4 | 8 | 12 |
|---|---|---|---|
| 2 | 6 | 10 | 13 |
| 3 | 7 | 11 | 15 |
| 5 | 9 | 14 | 16 |

FIG. 18

| | | | | | | | | | | | | | | | |
|---|---|---|---|---|---|---|---|---|---|---|---|---|---|---|---|
| 1% | 0% | 0% | 0% | 0% | 0% | 0% | 0% | 0% | 0% | 0% | 0% | 0% | 0% | 0% | 0% |
| 1% | 1% | 1% | 0% | 0% | 0% | 0% | 0% | 0% | 0% | 0% | 0% | 0% | 0% | 0% | 0% |
| 1% | 1% | 1% | 1% | 1% | 1% | 0% | 0% | 0% | 0% | 0% | 0% | 0% | 0% | 0% | 0% |
| 2% | 1% | 1% | 1% | 1% | 1% | 1% | 1% | 0% | 0% | 0% | 0% | 0% | 0% | 0% | 0% |
| 3% | 2% | 2% | 2% | 2% | 1% | 1% | 1% | 1% | 0% | 0% | 0% | 0% | 0% | 0% | 0% |
| 4% | 3% | 3% | 3% | 2% | 2% | 2% | 2% | 1% | 1% | 1% | 1% | 0% | 0% | 0% | 0% |
| 6% | 5% | 4% | 4% | 3% | 3% | 2% | 2% | 2% | 1% | 1% | 0% | 0% | 3% | 0% | 0% |
| 8% | 7% | 6% | 5% | 5% | 4% | 3% | 3% | 2% | 2% | 1% | 1% | 1% | 0% | 0% | 0% |
| 12% | 9% | 8% | 7% | 6% | 5% | 4% | 4% | 3% | 2% | 2% | 1% | 1% | 1% | 0% | 0% |
| 15% | 13% | 11% | 9% | 8% | 7% | 6% | 5% | 4% | 3% | 2% | 2% | 1% | 1% | 0% | 0% |
| 22% | 18% | 16% | 13% | 11% | 10% | 8% | 6% | 5% | 4% | 3% | 2% | 1% | 1% | 1% | 0% |
| 29% | 25% | 21% | 18% | 15% | 12% | 10% | 8% | 6% | 5% | 3% | 3% | 2% | 1% | 1% | 1% |
| 39% | 32% | 28% | 22% | 19% | 16% | 13% | 10% | 8% | 5% | 4% | 3% | 2% | 2% | 1% | 1% |
| 53% | 45% | 38% | 31% | 25% | 20% | 16% | 13% | 10% | 7% | 5% | 4% | 3% | 2% | 1% | 1% |
| 72% | 58% | 48% | 38% | 32% | 24% | 19% | 15% | 12% | 8% | 6% | 5% | 3% | 2% | 2% | 1% |
| 91% | 77% | 61% | 49% | 39% | 31% | 23% | 18% | 14% | 10% | 7% | 5% | 4% | 3% | 2% | 2% |

FIG. 14

| 3% | 4% | 6% | 7% | 11% | 14% | 19% | 24% | 30% | 37% | 46% | 53% | 62% | 71% | 79% | 91% |
|---|---|---|---|---|---|---|---|---|---|---|---|---|---|---|---|
| 1% | 1% | 2% | 3% | 5% | 7% | 9% | 13% | 16% | 22% | 27% | 35% | 41% | 49% | 57% | 65% |
| 0% | 1% | 1% | 2% | 3% | 4% | 6% | 8% | 11% | 15% | 19% | 24% | 30% | 36% | 42% | 48% |
| 0% | 0% | 1% | 1% | 2% | 3% | 4% | 6% | 8% | 11% | 14% | 17% | 21% | 26% | 30% | 36% |
| 0% | 0% | 0% | 0% | 1% | 2% | 3% | 4% | 6% | 7% | 10% | 12% | 14% | 18% | 22% | 26% |
| 0% | 0% | 0% | 0% | 1% | 2% | 2% | 3% | 4% | 5% | 7% | 9% | 11% | 13% | 15% | 19% |
| 0% | 0% | 0% | 0% | 0% | 1% | 1% | 2% | 3% | 3% | 5% | 6% | 7% | 9% | 10% | 12% |
| 0% | 0% | 0% | 0% | 0% | 0% | 1% | 1% | 2% | 2% | 3% | 4% | 5% | 6% | 7% | 8% |
| 0% | 0% | 0% | 0% | 0% | 0% | 0% | 1% | 1% | 2% | 2% | 3% | 3% | 4% | 4% | 5% |
| 0% | 0% | 0% | 0% | 0% | 0% | 0% | 0% | 1% | 1% | 1% | 2% | 2% | 2% | 3% | 3% |
| 0% | 0% | 0% | 0% | 0% | 0% | 0% | 0% | 0% | 0% | 1% | 1% | 1% | 1% | 2% | 2% |
| 0% | 0% | 0% | 0% | 0% | 0% | 0% | 0% | 0% | 0% | 0% | 0% | 1% | 1% | 1% | 1% |
| 0% | 0% | 0% | 0% | 0% | 0% | 0% | 0% | 0% | 0% | 0% | 0% | 0% | 0% | 0% | 1% |
| 0% | 0% | 0% | 0% | 0% | 0% | 0% | 0% | 0% | 0% | 0% | 0% | 0% | 0% | 0% | 0% |
| 0% | 0% | 0% | 0% | 0% | 0% | 0% | 0% | 0% | 0% | 0% | 0% | 0% | 0% | 0% | 0% |
| 0% | 0% | 0% | 0% | 0% | 0% | 0% | 0% | 0% | 0% | 0% | 0% | 0% | 0% | 0% | 0% |

| 93% | 72% | 56% | 41% | 29% | 20% | 12% | 7% | 5% | 3% | 1% | 0% | 0% | 0% | 0% | 0% |
|---|---|---|---|---|---|---|---|---|---|---|---|---|---|---|---|
| 86% | 68% | 52% | 38% | 27% | 17% | 10% | 6% | 4% | 2% | 1% | 0% | 0% | 0% | 0% | 0% |
| 82% | 64% | 48% | 36% | 24% | 16% | 10% | 6% | 3% | 2% | 1% | 0% | 0% | 0% | 0% | 0% |
| 77% | 59% | 45% | 31% | 21% | 14% | 9% | 5% | 3% | 2% | 1% | 0% | 0% | 0% | 0% | 0% |
| 72% | 55% | 40% | 28% | 19% | 13% | 8% | 4% | 3% | 1% | 0% | 0% | 0% | 0% | 0% | 0% |
| 68% | 49% | 36% | 25% | 17% | 11% | 7% | 4% | 2% | 1% | 0% | 0% | 0% | 0% | 0% | 0% |
| 61% | 43% | 32% | 22% | 15% | 9% | 5% | 3% | 2% | 1% | 0% | 0% | 0% | 0% | 0% | 0% |
| 54% | 37% | 27% | 18% | 12% | 8% | 5% | 3% | 2% | 1% | 0% | 0% | 0% | 0% | 0% | 0% |
| 48% | 31% | 21% | 15% | 10% | 6% | 4% | 2% | 1% | 0% | 0% | 0% | 0% | 0% | 0% | 0% |
| 40% | 25% | 17% | 11% | 7% | 5% | 3% | 2% | 1% | 0% | 0% | 0% | 0% | 0% | 0% | 0% |
| 33% | 20% | 13% | 9% | 6% | 3% | 2% | 1% | 0% | 0% | 0% | 0% | 0% | 0% | 0% | 0% |
| 27% | 16% | 9% | 6% | 4% | 2% | 1% | 0% | 0% | 0% | 0% | 0% | 0% | 0% | 0% | 0% |
| 21% | 12% | 7% | 5% | 3% | 2% | 1% | 0% | 0% | 0% | 0% | 0% | 0% | 0% | 0% | 0% |
| 17% | 9% | 5% | 3% | 2% | 1% | 1% | 0% | 0% | 0% | 0% | 0% | 0% | 0% | 0% | 0% |
| 13% | 6% | 4% | 2% | 1% | 1% | 0% | 0% | 0% | 0% | 0% | 0% | 0% | 0% | 0% | 0% |
| 10% | 5% | 3% | 1% | 1% | 0% | 0% | 0% | 0% | 0% | 0% | 0% | 0% | 0% | 0% | 0% |

FIG. 17

ID USC 9,392,288 B2

VIDEO CODING USING SCATTER-BASED SCAN TABLES

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

BRIEF SUMMARY

This disclosure relates generally to encoding and decoding video data and more particularly relates to coding using scatter-based scan tables. According to one method described herein, decoding an encoded video stream includes identifying a one-dimensional (1D) transform coefficient array including a plurality of transform coefficients corresponding to a block of a frame of the encoded video stream, identifying a transform coefficient from the plurality of transform coefficients, including the transform coefficient in a two-dimensional (2D) transform coefficient array at a 2D array position based on a 1D array position of the transform coefficient in the 1D transform coefficient array and a probability associated with the 2D array position, wherein the probability is based on one or more video streams other than the encoded video stream, generating a decoded block based on the 2D transform coefficient array, and including the decoded block in a decoded video stream.

An example of an apparatus for decoding an encoded video stream described herein includes a memory and a processor. The processor is configured to execute instructions stored in the memory to identify a one-dimensional (1D) transform coefficient array including a plurality of transform coefficients corresponding to a block of a frame of the encoded video stream, identify a transform coefficient from the plurality of transform coefficients, include the transform coefficient in a two-dimensional (2D) transform coefficient array at a 2D array position based on a 1D array position of the transform coefficient in the 1D transform coefficient array and a probability associated with the 2D array position, wherein the probability is based on one or more video streams other than the encoded video stream, generate a decoded block based on the 2D transform coefficient array, and include the decoded block in a decoded video stream.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein:

FIGS. 7A, 7B and 7C are diagrams illustrating scan patterns for a 4×4 block;

FIGS. 8A-8D are diagrams illustrating the use of a scatter-based scan table for a 4×4 block transformed using a first combination of transforms;

FIGS. 9A-9C are diagrams illustrating the use of a scatter-based scan table for a 4×4 block transformed using a second combination of transforms;

FIGS. 10A-10C are diagrams illustrating the use of a scatter-based scan table for a 4×4 block transformed using a third combination of transforms;

FIG. 11 is a diagram of percentages of non-zero coefficients for an 8×8 block transformed using the first combination of transforms;

FIG. 12 is a diagram of percentages of non-zero coefficients for an 8×8 block transformed using the second combination of transforms;

FIG. 13 is a diagram of percentages of non-zero coefficients for an 8×8 block transformed using the third combination of transforms;

FIG. 14 is a diagram of percentages of non-zero coefficients for a 16×16 block transformed using the first combination of transforms;

FIG. 15 is a diagram of percentages of non-zero coefficients for a 16×16 block transformed using the second combination of transforms;

FIG. 16 is a diagram of percentages of non-zero coefficients for a 16×16 block transformed using the third combination of transforms;

FIG. 17 is a diagram of a scatter-based scan table for a 16×16 block transformed using the first combination of transforms; and FIG. 18 is a diagram of a two-dimensional array generated using the one-dimensional array of FIG. 10C.

DETAILED DESCRIPTION

Figure 1:
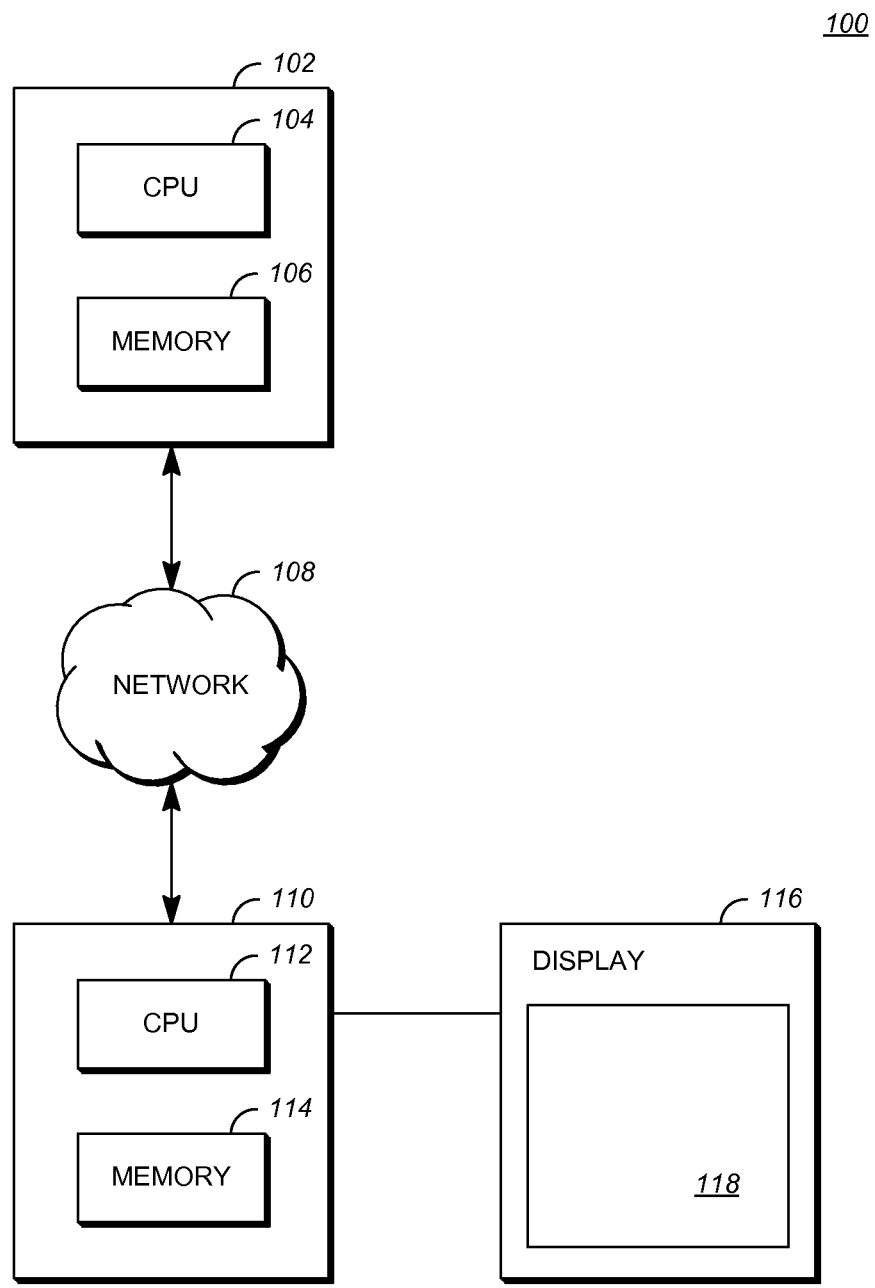
FIG. 1 is a schematic of a video encoding and decoding system in accordance with implementations of this disclosure.

Compression schemes related to coding video streams may include breaking each image into blocks and generating an output digital video stream using one or more techniques to limit the information included in the output. A received encoded video stream can be decoded to re-create the blocks and the source images from the limited information. Encoding a video stream, or a portion thereof, such as a frame or a block, can include using transforms applied at the block level. Transforming the pixel data can permit quantization to reduce the number of states required to represent the data while avoiding some of the artifacts that can occur in the video data if quantization is applied to the pixels directly. Blocks having pixel or transform coefficient data will be referred to interchangeably as blocks or 2D arrays herein.

One example of transforming pixel data uses a transform such as a discrete cosine transform (DCT) or an asymmetric discrete sine transform (ADST) that concentrates higher values in the upper left-hand corner of the resulting 2D array. Transforming pixel data using hybrid transforms that combine asymmetric discrete sine transforms with discrete cosine transforms (ADST/DCT) or (DCT/ADST) can concentrate higher values along either the top row or left-hand column in addition to the upper left-hand corner. When quantized, the non-zero values are similarly concentrated. Zero values may also exist in the transformed block. Depending upon the size of the block, the original data and the quantizer value, the number of zero values when the transformed coefficients are quantized may include a majority of the array values. When describing transform coefficients herein, those transform coefficients may be quantized values unless otherwise stated.

One technique for compressing this data further includes selecting the 2D array of transform coefficients in a scan order or pattern. When the last non-zero coefficient is reached, the trailing zero transform coefficient values can be replaced with an end of block (EOB) token. This reduces the amount of zero values transmitted. Examples of scan patterns include a zig-zag pattern and column- or row-based scan patterns described in more detail hereinafter. These scan patterns may be stored as tables for use by both an encoder and decoder indicating under what conditions a particular table is used. Such scan orders may be referred to herein as raster-based scan orders.

In contrast, the teachings herein describe the use of a scatter-based scan table that defines a scatter scan order that is not raster-based. The scatter-based scan table may be generated by calculating, for a large number of blocks from sample video streams, the probability that a given position in a block will yield a non-zero transform coefficient after the original block data is transformed and optionally quantized. The calculated probabilities are then ordered in rank order and a "scatter" scan pattern for the block is derived from the rank order of calculated probabilities. The calculated probabilities will differ based on, for example, the size of the block and the type of transforms used.

The scatter scan pattern may be used to convert a block comprising a 2D array of transform coefficients to a 1D array so that non-zero values will have a higher probability of being arranged at the beginning of the 1D array and zero values will have a higher probability of being arranged at the end of the 1D vector than if a sequential scan pattern were employed. This type of analysis and processing can be performed for each block size to be used in coding a video stream, including block of sizes 4×4, 8×8, 16×16 or 32×32 pixels, for example. The scatter scan patterns may be stored in both an encoder and a decoder to permit video streams to be encoded and subsequently decoded using the same scatter scan pattern without having to transmit the scatter scan patterns along with the encoded video stream. The scatter scan patterns may be stored in table form with index values indicating the block size and transform types associated with each pattern.

Scatter scan patterns can be distinguished from raster-based scan patterns, for example, according to the manner in which distance between adjacent transform coefficients can change between their positions in a 1D array and their positions in a 2D array. Distance can be defined as rectilinear or Manhattan distance, where distance is defined as the sum absolute differences of their Cartesian coordinates. For example, in a 2D array, pixels that are diagonally situated with respect to each other are a distance of two in rectilinear distance as measured in coordinate space. In a 1D array, the rectilinear distance is the absolute value of the difference in indices in the 1D array. Therefore, coefficients that are adjacent in a 1D array are a distance of one from each other.

In some raster-based scan patterns, for example row or column-based scan patterns, coefficients that are adjacent when arranged into the scan order with a distance of one between them most often have a distance of one between them in their positions in the original block arrangement. The exceptions are at the end a column or row. For a zig-zag scan pattern, coefficients that are adjacent when arranged into the scan order often have a distance of two between them with a distance of two between them in the original block arrangement. Alternatively, such coefficients have a distance of one in both the scan order arrangement and the original block arrangement. Scatter scan patterns, because the coefficients are based on probability instead of a set raster-based scan order based on 2D array position, can distribute coefficients such that a distance between a coefficient in a 1D array and each of its adjacent coefficient is less than two but the distance between the coefficient and each adjacent coefficient in the 2D array is at least two.

FIG. 1 is a schematic of a video encoding and decoding system 100 in which aspects of the disclosure can be implemented. An exemplary transmitting station 102 can be, for example, a computer having an internal configuration of hardware including a processor such as a central processing unit (CPU) 104 and a memory 106. CPU 104 is a controller for controlling the operations of transmitting station 102. CPU 104 can be connected to the memory 106 by, for example, a memory bus. Memory 106 can be read only memory (ROM), random access memory (RAM) or any other suitable memory device. Memory 106 can store data and program instructions that are used by CPU 104. Other suitable implementations of transmitting station 102 are possible. For example, the processing of transmitting station 102 can be distributed among multiple devices.

A network 108 connects transmitting station 102 and a receiving station 110 for encoding and decoding of the video stream. Specifically, the video stream can be encoded in transmitting station 102 and the encoded video stream can be decoded in receiving station 110. Network 108 can be, for example, the Internet. Network 108 can also be a local area network (LAN), wide area network (WAN), virtual private network (VPN), a cellular telephone network or any other means of transferring the video stream from transmitting station 102 to, in this example, receiving station 110.

Receiving station 110 can, in one example, be a computer having an internal configuration of hardware including a processor such as a CPU 112 and a memory 114. CPU 112 is a controller for controlling the operations of receiving station 110. CPU 112 can be connected to memory 114 by, for example, a memory bus. Memory 114 can be ROM, RAM or any other suitable memory device. Memory 114 can store data and program instructions that are used by CPU 112. Other suitable implementations of receiving station 110 are possible. For example, the processing of receiving station 110 can be distributed among multiple devices.

A display 116 configured to display a video stream can be connected to receiving station 110. Display 116 can be implemented in various ways, including by a liquid crystal display (LCD), a cathode-ray tube (CRT), or a light emitting diode display (LED), such as an OLED display. Display 116 is coupled to CPU 112 and can be configured to display a rendering 118 of the video stream decoded in receiving station 110.

Other implementations of the encoder and decoder system 100 are also possible. For example, one implementation can omit network 108 and/or display 116. In another implementation, a video stream can be encoded and then stored for transmission at a later time by receiving station 110 or any other device having memory. In one implementation, receiving station 110 receives (e.g., via network 108, a computer bus, or some communication pathway) the encoded video stream and stores the video stream for later decoding. In another implementation, additional components can be added to the encoder and decoder system 100. For example, a display or a video camera can be attached to transmitting station 102 to capture the video stream to be encoded.

Figure 2:
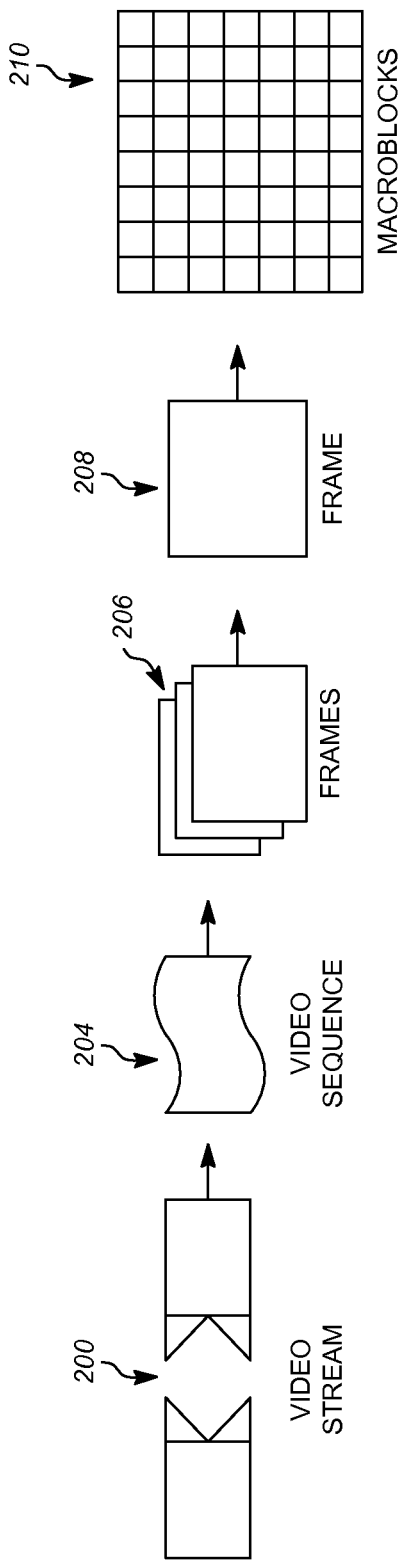
FIG. 2 is a diagram of an example video stream to be encoded and decoded in accordance with implementations of this disclosure.

FIG. 2 is a diagram of an example video stream 200 to be encoded and decoded. Video stream 200 (also referred to herein as video data) includes a video sequence 204. At the next level, video sequence 204 includes a number of adjacent frames 206. While three frames are depicted in adjacent frames 206, video sequence 204 can include any number of adjacent frames. Adjacent frames 206 can then be further subdivided into individual frames, e.g., a single frame 208. Each frame 208 can capture a scene with one or more objects, such as people, background elements, graphics, text, a blank wall, or any other information.

At the next level, single frame 208 can be divided into a set of blocks 210, which can contain data corresponding to, in some of the examples described below, a 8×8 pixel group in frame 208. Block 210 can also be of any other suitable size such as a block of 16×8 pixels, a block of 8×8 pixels, a block of 16×16 pixels, a block of 4×4 pixels, or of any other size. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
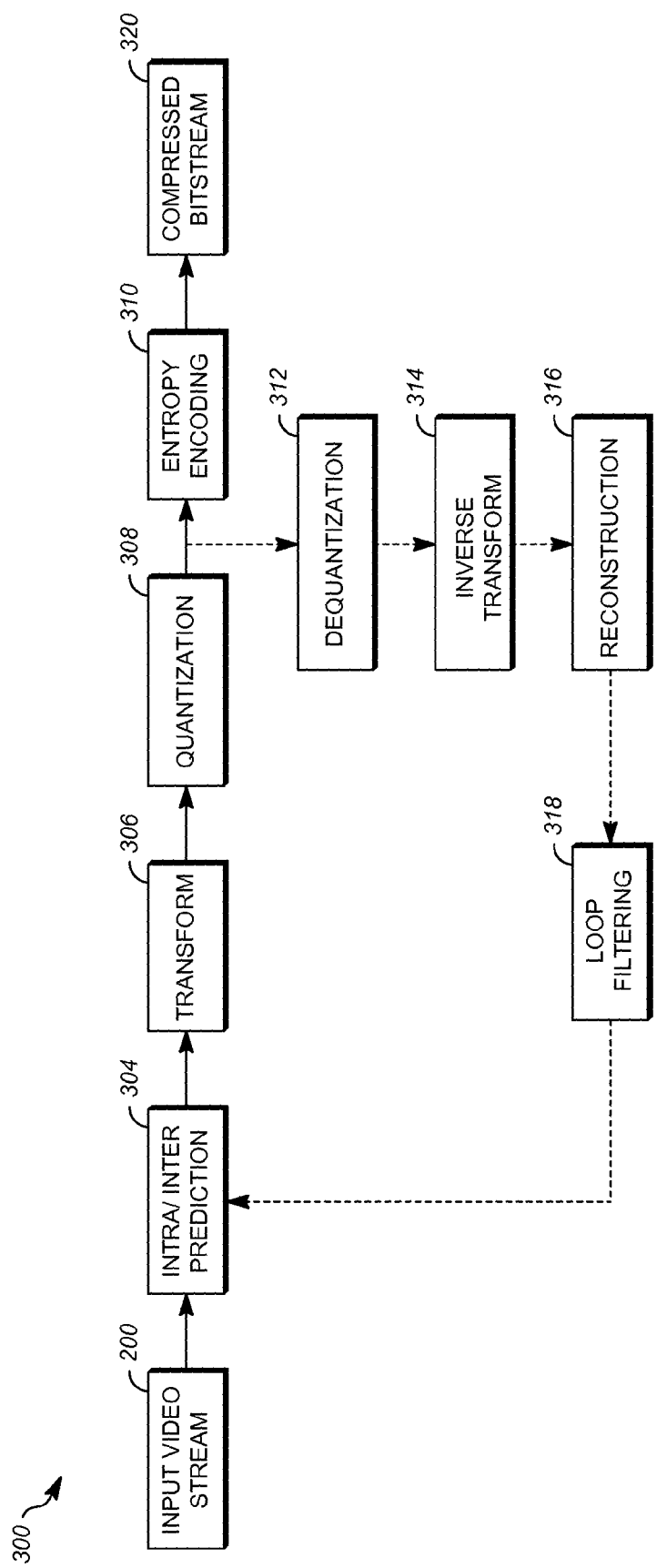
FIG. 3 is a block diagram of a video compression system in accordance with an implementation of this disclosure.

FIG. 3 is a block diagram of an encoder 300 in accordance with an implementation of this disclosure. Encoder 300 can be implemented, as described above, in transmitting station 102 such as by providing a computer software program stored in memory 106, for example. The computer software program can include machine instructions that, when executed by CPU 104, cause transmitting station 102 to encode video data in the manner described in FIG. 3. Encoder 300 can also be implemented as specialized hardware in, for example, transmitting station 102. Encoder 300 has the following stages to perform the various functions in a forward path (shown by the solid connection lines) to produce an encoded or a compressed video stream 320 using input video stream 200: an intra/inter prediction stage 304, a transform stage 306, a quantization stage 308, and an entropy encoding stage 310. Encoder 300 may include a reconstruction path (shown by the dotted connection lines) to reconstruct a frame for encoding of future blocks. In FIG. 3, encoder 300 has the following stages to perform the various functions in the reconstruction path: a dequantization stage 312, an inverse transform stage 314, a reconstruction stage 316, and a loop filtering stage 318. Other structural variations of encoder 300 can be used to encode video stream 200.

When video stream 200 is presented for encoding, each frame 208 within video stream 200 can be processed in units of blocks. Referring to FIG. 3, at intra/inter prediction stage 304, each block can be encoded using either intra-frame prediction (also called intra prediction) or inter-frame prediction (also called inter prediction). In either case, a prediction block can be formed. The prediction block is then subtracted from the block to produce a residual block (also referred to herein as a residual).

Intra prediction and inter prediction are techniques used in image/video compression schemes. In the case of intra prediction, a prediction block can be formed from samples in the current frame that have been previously encoded and reconstructed. In the case of inter prediction, a prediction block can be formed from samples in one or more previously constructed reference frames, such as the last frame (i.e., the adjacent frame immediately before the current frame), the golden frame or a constructed or alternate frame. Various inter and intra prediction modes are available to intra/inter prediction stage 304 to obtain a prediction block that is most similar to the block to minimize the information to be encoded in the residual so as to later re-create the block.

Next, still referring to FIG. 3, transform stage 306 transforms the residual into a block of transform coefficients in, for example, the frequency domain. Examples of block-based transforms include the Karhunen-Loève Transform (KLT), the Discrete Cosine Transform (DCT), Walsh-Hadamard Transform (WHT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (e.g., DC) coefficient at the top-left of the array and the highest frequency coefficient at the bottom-right of the array.

Quantization stage 308 converts the block of transform coefficients into discrete quantum values, which are referred to as quantized transform coefficients, using a quantizer value or quantization level. The quantized transform coefficients are then entropy encoded by entropy encoding stage 310 after they are arranged based on a scatter scan order as described herein. The entropy-encoded coefficients, together with other information used to decode the block, which can include for example the type of prediction used, motion vectors and quantization value, are then output to compressed stream 320. Compressed video stream 320 can be formatted using various techniques, such as variable length encoding (VLC) and arithmetic coding. Compressed video stream 320 can also be referred to as an encoded video stream and the terms will be used interchangeably herein.

The reconstruction path in FIG. 3 (shown by the dotted connection lines) can be used to provide both encoder 300 and a decoder 400 (described below) with the same reference frames to decode compressed video stream 320. The reconstruction path performs functions that are similar to functions that take place during the decoding process that are discussed in more detail below, including dequantizing the quantized transform coefficients at dequantization stage 312 to generate dequantized transform coefficients and inverse transforming the dequantized transform coefficients at inverse transform stage 314 to produce a derivative residual block (i.e., derivative residual). At reconstruction stage 316, the prediction block that was predicted at intra/inter prediction stage 304 can be added to the derivative residual to create a reconstructed block. In some implementations, loop filtering stage 318 can be applied to the reconstructed block to reduce distortion such as blocking artifacts.

Other variations of encoder 300 can be used. For example, a non-transform based encoder 300 can quantize one or more residual blocks directly without transform stage 304. In another implementation, an encoder 300 can have quantization stage 308 and dequantization stage 312 combined into a single stage.

Figure 4:
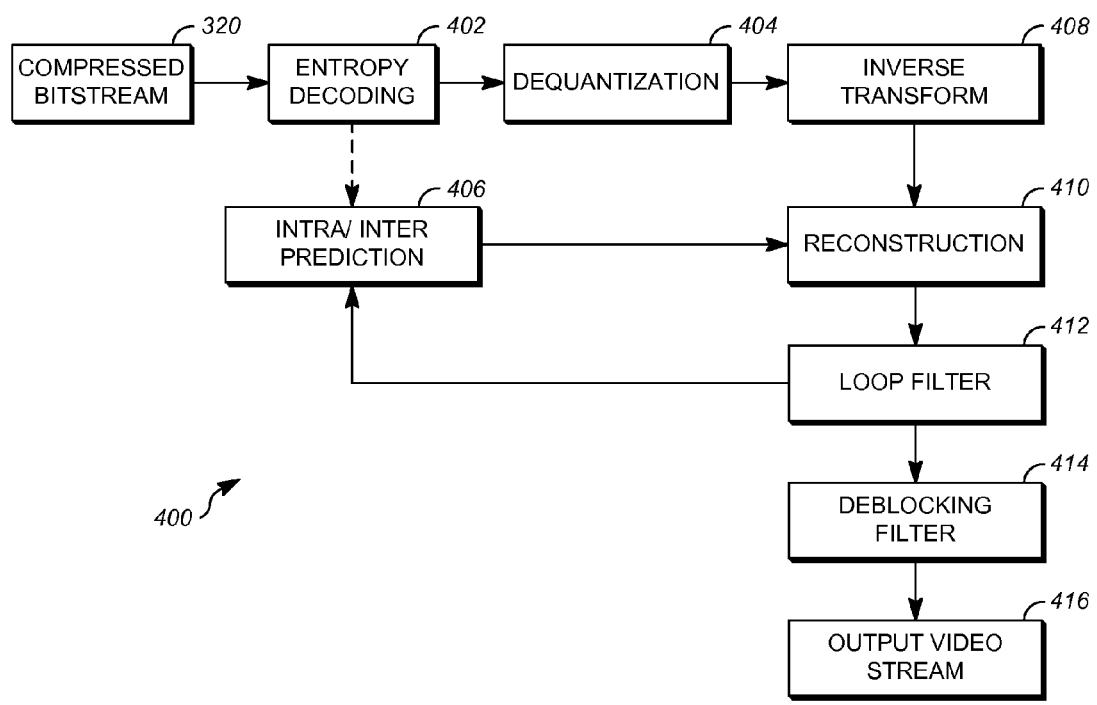
FIG. 4 is a block diagram of a video decompression system in accordance with another implementation of this disclosure.

FIG. 4 is a block diagram of a decoder 400 in accordance with implementations of this disclosure. Decoder 400 can be implemented, for example, in receiving station 110, such as by providing a computer software program stored in memory for example. The computer software program can include machine instructions that, when executed by CPU 112, cause receiving station 110 to decode video data in the manner described in FIG. 4. Decoder 400 can also be implemented as specialized hardware or firmware in, for example, transmitting station 102 or receiving station 110.

Decoder 400, similar to the reconstruction path of encoder 300 discussed above, includes in one example the following stages to perform various functions to produce an output video stream 416 from compressed video stream 320: an entropy decoding stage 402, a dequantization stage 404, an inverse transform stage 406, an intra/inter prediction stage 408, a reconstruction stage 410, a loop filtering stage 412, and a deblocking filtering stage 414. Other structural variations of decoder 400 can be used to decode compressed video stream 320.

When compressed video stream 320 is presented for decoding, the data elements within compressed video stream 320 can be decoded by the entropy decoding stage 402 (using, for example, arithmetic coding) to produce a set of quantized transform coefficients. Dequantization stage 404 dequantizes the quantized transform coefficients and inverse transform stage 406 inverse transforms the dequantized transform coefficients to produce a derivative residual that can be identical to that created by reconstruction stage 316 in encoder 300. Before applying the inverse transforms of inverse transform stage 406, the coefficients are rearranged from a 1D array after entropy decoding to a 2D array using the scatter scan order as described in additional detail herein. Using header information decoded from compressed video stream 320, decoder 400 can use intra/inter prediction stage 408 to create the same prediction block as was created in encoder 300, e.g., at intra/inter prediction stage 304. In the case of inter prediction, the reference frame from which the prediction block is generated may be transmitted in the video stream or constructed by the decoder using information contained within the video stream.

At reconstruction stage 410, the prediction block can be added to the derivative residual to create a reconstructed block that can be identical to the block created by reconstruction stage 316 in encoder 300. In some implementations, loop filtering stage 412 can be applied to the reconstructed block to reduce blocking artifacts. Deblocking filtering stage 414 can be applied to the reconstructed block to reduce blocking distortion, and the result is output as output video stream 416. Output video stream 416 can also be referred to as a decoded video stream and the terms will be used interchangeably herein.

Other variations of decoder 400 can be used to decode compressed video stream 320. For example, decoder 400 can produce output video stream 416 without deblocking filtering stage 414.

Figure 5:
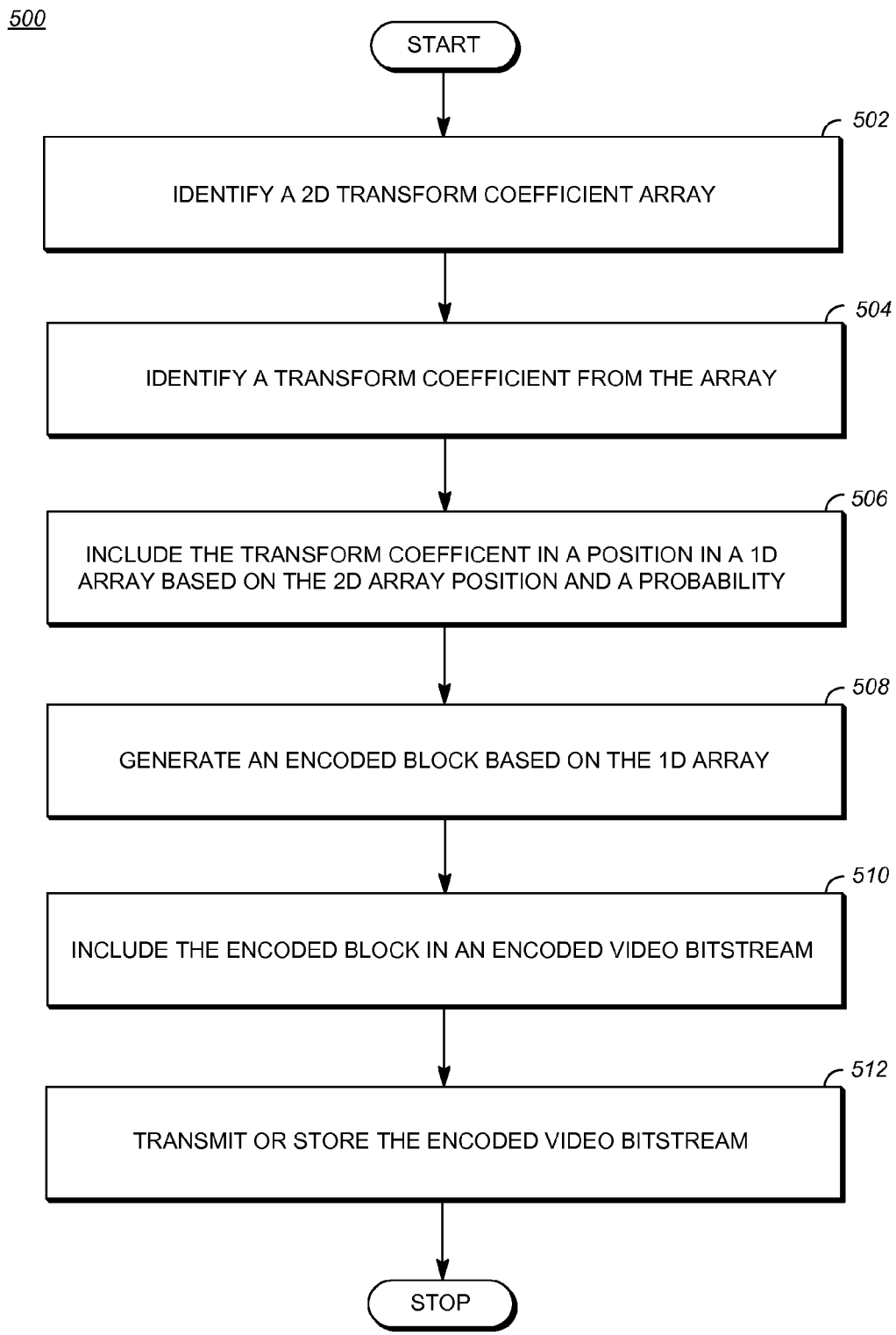
FIG. 5 is a flow diagram of a process for encoding blocks of frames of a video stream in accordance with an implementation of this disclosure.

FIG. 5 is a flow diagram showing a process 500 for encoding a video stream in accordance with an implementation of this disclosure. Process 500 may also be referred to as a method of operation and can be implemented in an encoder such as encoder 300 (shown in FIG. 3). Process 500 may be implemented, for example, as a software program that can be executed by computing devices such as transmitting station 102 or receiving station 110 (shown in FIG. 1). For example, the software program can include machine-readable instructions that can be stored in a memory such as memory 106 or memory 114, and that can be executed by a processor, such as CPU 104, to cause the computing device to perform process 500. Process 500 may also be implemented in whole or in part using specialized hardware or firmware.

For simplicity of explanation, process 500 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter. Some computing devices can have multiple memories, multiple processors, or both. The steps of process 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps.

At step 502, process 500 can identify a 2D array of transform coefficients including a plurality of transform coefficients corresponding to a block of a frame of the video stream to be encoded. The 2D array of transform coefficients can be formed by an encoder such as encoder 300 in FIG. 3. The 2D array of transform coefficients can be formed by transforming the pixels of a block of a frame using transforms as discussed in relation to FIG. 3. The 2D array of transform coefficients may be quantized transform coefficients fed into entropy encoding stage 310 of FIG. 3.

At step 504, a single transform coefficient is identified from the plurality of transform coefficients of the 2D array. In operation, an encoder can process each of the transform coefficients of the 2D array to form a 1D array of transform coefficients.

At step 506, the transform coefficient identified at step 504 is included in the 1D array of transform coefficients at an array position based on the position of the transform coefficient in the 2D array and a probability associated with the array position. The probability associated with the 2D array position may be found in a scatter-based or scatter scan table as described briefly above. The scatter scan tables are described with reference to FIGS. 7A through 16.

FIGS. 7A, 7B and 7C are diagrams illustrating scan patterns for a 4×4 block 700. Block 700 is a 4×4 block represented as a 2D array with the transform coefficient positions indicated on the array. The subscripts of the coefficients represent their positions in the array in an X-Y coordinate scheme. For example, the top-left corner block is represented by quantized transform coefficient $C_{00}$. For further encoding (e.g., entropy coding) block 700, the transform coefficients $C_{00}$-$C_{33}$ are selected in a different sequential scan order. Two possible raster-based scan orders are shown in FIGS. 7B and 7C. FIG. 7B indicates a zig-zag scan order 702, and FIG. 7C indicates a vertical scan order 704. In each of FIGS. 7B and 7C, the numbers illustrate the scan order for the given coefficient, where the value 1 indicates the first transform coefficient in each of zig-zag scan order 702 and vertical scan order 704, the value 2 indicates the second transform coefficient in each of zig-zag scan order 702 and vertical scan order 704, etc. Zig-zag scan order 702 of transform coefficients 00-15 is: $C_{00}$-$C_{01}$-$C_{10}$-$C_{20}$-$C_{11}$-$C_{02}$-$C_{03}$-$C_{12}$-$C_{21}$-$C_{30}$-$C_{31}$-$C_{22}$-$C_{13}$-$C_{23}$-$C_{32}$-$C_{33}$, for example. As mentioned briefly above, such raster-based scan orders may not result in a minimal number of transform coefficients before an EOB token may be assigned. That is, by using a raster-based scan order, one or more zero coefficients may be combined with the non-zero coefficients at the beginning of resulting sequence of transform coefficients instead of being grouped at the end of the sequence such that they made be replaced by a single EOB token. The placement of zero coefficients before the EOB token increases the number coefficients that are further encoded.

In contrast, FIGS. 8A-8D are diagrams illustrating the use of a scatter-based scan table for a 4×4 block transformed using a first combination of transforms. FIG. 8A shows percentages of non-zero coefficients represented by a 2D array 800. The entries in array 800 show the probabilities (in percentages) that a transform coefficient at each position can have a non-zero value following the first combination of transforms and quantization. In this example, the first combination of transforms is a DCT/DCT combination or an ADST/ADST combination. The probabilities are formed by processing one or more video streams, and desirably a large number of video streams, calculating transform coefficients for 4×4 blocks of frames of the one or more video streams subject to the first combination of transforms and calculating the percentage of non-zero values at each position of the resulting 4×4 blocks.

FIG. 8B is a sequence of percentages drawn from the percentages of non-zero coefficients of FIG. 8A. In FIG. 8B, the probabilities of 2D array 800 are re-ordered by decreasing order into the sequence or 1D array 802 so that the transform coefficients with the highest probability of being non-zero are near the beginning of 1D array 802 and the transform coefficients with the lowest probability of being non-zero are near the end of 1D array 802. FIG. 8C is a 1D array 804 illustrating a scatter scan order using 1D array 802 of FIG. 8B. Using a 1D array of positions such as 1D array 804 to arrange transform coefficients from a 2D array to a 1D array can result in a 1D array where the transform coefficients near the beginning or left hand side of the 1D array have the highest probability of being non-zero and the transform coefficients near the end or right hand side of the 1D array have the lowest probability of being non-zero.

In cases where two or more positions in the 2D array such as array 800 have the same probability of being non-zero, a policy decision can determine which one will occur first in the 1D array such as 1D array 804. One possible policy decision may be to identify the probability that would be encountered first if the 2D array were to be scanned using a zig-zag pattern, for example. Another could be to select the lower value position within the array. Any policy regarding positions having the same probability may be used as long as the mapping of the 2D array position to a 1D array position is same for both the encoder and decoder. 1D array 804 represents an entry in one or more scatter-based tables that may be indexed by block size and/or transform combination. In the case of FIGS. 8A-8D, the block size is 4×4, and the transform combination is both DCT/DCT and ADST/ADST. FIG. 8D is described below.

FIGS. 9A-9C are diagrams illustrating the use of a scatter-based scan table for a 4×4 block transformed using a second combination of transforms. In this case, the percentages of FIG. 9A form a 2D array 900 showing the probability that a transform coefficient at each position in a 4×4 block may have a non-zero value following transformation that applies DCT horizontally and ADST vertically. Similarly to the discussion above in relation to FIG. 8A, these probabilities are formed by processing one or more video streams, calculating quantized transform coefficients for 4×4 blocks of frames of the video streams that are subject to the second combination of transforms and calculating the percentages for each block position. FIG. 9B, like FIG. 8B, is a 1D array 902 with the probabilities arranged in decreasing order so that the transform coefficients with the highest probability of being non-zero are near the beginning of 1D array 902 and the transform coefficients with the lowest probability of being non-zero are near the end of 1D array 902. FIG. 9C is a 1D array 904 illustrating a scatter scan order using 1D array 902 of FIG. 9B. 1D array 904 represents another entry in one or more scatter-based tables that may be indexed by block size and/or transform combination. In the case of FIGS. 9A-9C, the block size is 4×4, and the transform combination is ADST/DCT. The second combination of transforms may be used where, for example, a block is intra predicted using a vertical-based intra prediction mode. If relevant, that is, if the prediction mode makes a difference in the resulting 1D array, the entry may also be indexed by prediction mode.

FIGS. 10A-10C are diagrams illustrating the use of a scatter-based scan table for a 4×4 block transformed using a third combination of transforms. In this case, the percentages of FIG. 10A form a 2D array 1000 showing the probability that a transform coefficient at each position in a 4×4 block may have a non-zero value following transformation that applies ADST horizontally and DCT vertically. Similarly to the discussion above in relation to FIGS. 8A and 9A, these probabilities are formed by processing one or more video streams, calculating quantized transform coefficients for 4×4 blocks of frames that are subject to the third combination of transforms and calculating the percentages for each block position. FIG. 10B, like FIGS. 8B and 9B, is a 1D array 1002 with the probabilities arranged in decreasing order so that the transform coefficients with the highest probability of being non-zero are near the beginning of 1D array 1002 and the transform coefficients with the lowest probability of being non-zero are near the end of 1D array 1002. FIG. 10C is a 1D array 1004 illustrating a scatter scan order using 1D array 1002 of FIG. 10B. 1D array 1004 represents another entry in one or more scatter-based tables that may be indexed by block size and/or transform combination. In the case of FIGS. 10A-10C, the block size is 4×4, and the transform combination is DCT/ADST. This third combination of transforms may be used when a horizontal-based intra prediction mode is used in one example, and the scatter-based table may also be indexed by prediction mode if relevant.

Figure 17:
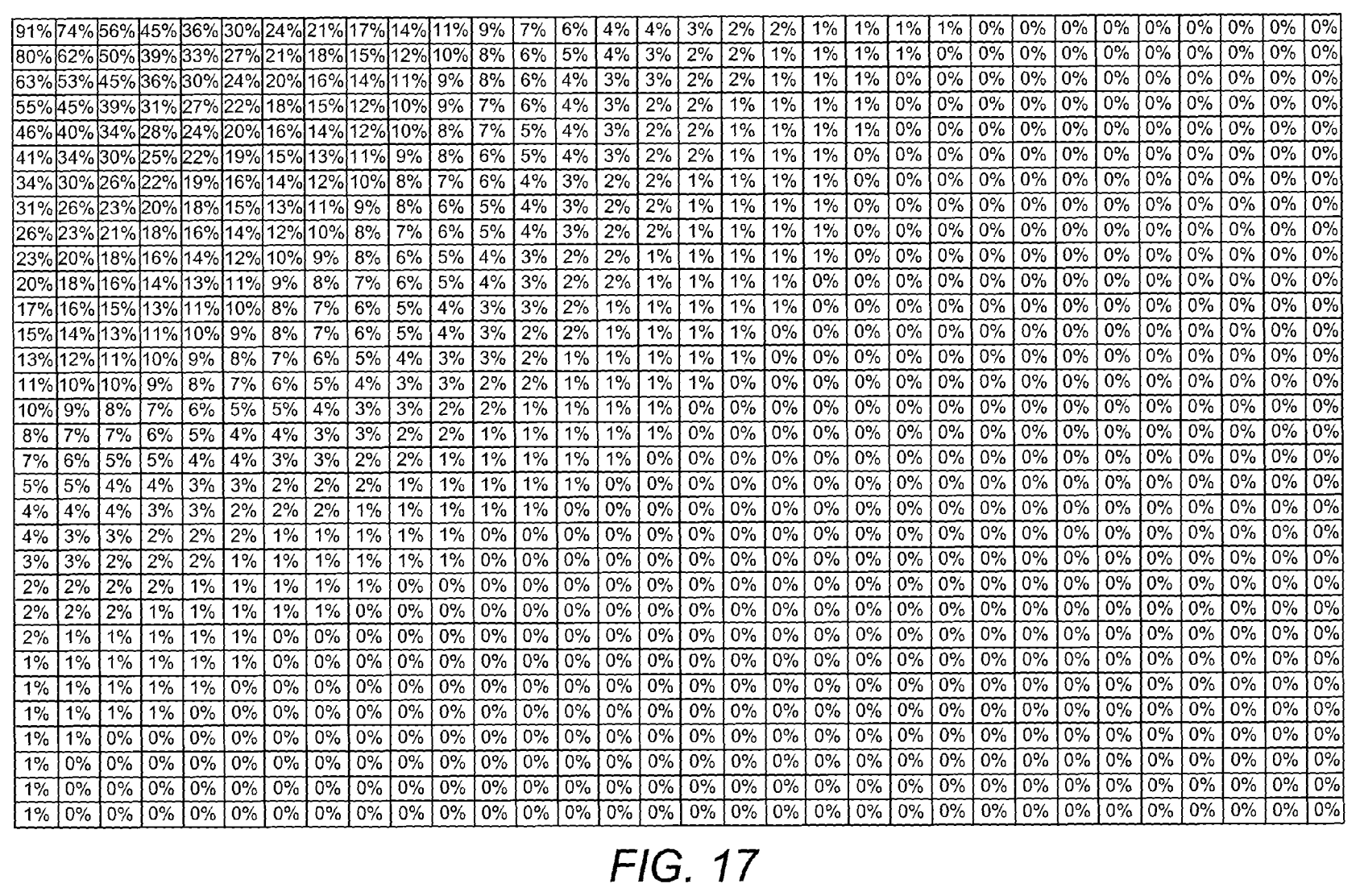

Blocks of other sizes than 4×4 may be used in accordance with the teachings herein as shown in FIGS. 11-17. FIGS. 11-13 provide examples of the teachings herein applied to 8×8 blocks, FIGS. 14-16 provide examples of the teachings herein applied to 16×16 blocks, and FIG. 17 provides an example of the teachings herein applied to a 32×32 block.

FIG. 11 is a diagram of percentages of non-zero coefficients for an 8×8 block transformed using the first combination of transforms. The first combination of transforms, in this example, is either DCT/DCT or ADST/ADST. The probabilities of FIG. 11 are values generated similarly to the process described above with respect to FIGS. 8A, 9A, 10A. In this case, those 8×8 residual blocks transformed using the first combination of transforms and then quantized from one or more sample video streams are used to generate the percentages of FIG. 11. The transform coefficients in each location for the blocks that have non-zero values versus those that have zero values are used to generate the probabilities in each location of FIG. 11. The 2D array of FIG. 11 may be used to generate an entry in one or more scatter-based scan tables as described above with respect to FIGS. 8B and 8C, 9B and 9C, and 10B and 10C. Index values for the entry may be an 8×8 block, the first combination of transforms and, if relevant, prediction mode.

FIG. 12 is a diagram of percentages of non-zero coefficients for an 8×8 block transformed using the second combination of transforms. The second combination of transforms in this example, as described above, is ADST/DCT. The probabilities of FIG. 12 are values generated similarly to the process described above with respect to FIG. 11. The 2D array of FIG. 12 may be used to generate an entry in one or more scatter-based scan tables as described above with respect to FIGS. 8B and 8C, 9B and 9C, and 10B and 10C. Index values for the entry may be an 8×8 block, the second combination of transforms and, if relevant, prediction mode.

FIG. 13 is a diagram of percentages of non-zero coefficients for an 8×8 block transformed using the third combination of transforms. The third combination of transforms, in this example, is DCT/ADST. The probabilities of FIG. 13 are values generated similarly to the process described above with respect to FIG. 11. The 2D array of FIG. 13 may be used to generate an entry in one or more scatter-based scan tables as described above with respect to FIGS. 8B and 8C, 9B and 9C, and 10B and 10C. Index values for the entry may be an 8×8 block, the third combination of transforms and, if relevant, the prediction mode.

FIG. 14 is a diagram of percentages of non-zero coefficients for a 16×16 block transformed using the first combination of transforms. FIG. 15 is a diagram of percentages of non-zero coefficients for a 16×16 block transformed using the second combination of transforms. FIG. 16 is a diagram of percentages of non-zero coefficients for a 16×16 block transformed using the third combination of transforms. FIG. 17 is a diagram of percentages of non-zero coefficients for a 16×16 block transformed using the first combination of transforms. The 2D arrays of FIGS. 14-17 may be generated and used as described above.

It is useful to note that FIGS. 8A-16 were generated using certain sets of blocks, prediction modes, transforms and quantization values. Accordingly, the 2D arrays and resulting 1D arrays are only examples of techniques for generating scatter-based scan table entries. Other block sizes, prediction modes, combinations of transforms and/or quantization values may be used. Further, since these examples are derived from certain sample video streams, other video streams may result in different values.

Referring again to FIG. 5, the one or more scatter-based scan tables generated as described above may be used in steps 504 and 506. As mentioned above, a transform coefficient is identified from the 2D transform coefficient array formed from a residual block at step 504. The identified transform coefficient is included in a 1D array of transform coefficients at an array position based on the position of the transform coefficient in the 2D array and a probability associated with the array position. This identification may be performed by selecting the appropriate table entry from a scatter-based scan table using the indices described above. For example, if the residual block is a 16×16 block transformed using ADST/DCT, a scan order such as that represented generated using the 2D array of FIG. 15 may be used to determine the position of each of the transform coefficients of the block for entropy encoding. In contrast, if the residual block is a 4×4 block transformed using DCT/DCT, a scan order such as that represented by 1D array 804 may be used to determine the position of each of the transform coefficients of the block for further encoding. In this latter example, if the transform coefficient is coefficient 03 in the 2D array of block 700, for example, the transform coefficient is at the $9^{th}$ position in the resulting 1D array by reference to 1D array 804. Such a transformation is applied to all transform coefficients associated with the current block.

At step 508, process 500 generates an encoded block based on the 1D array formed at step 506. The 1D array is formed by taking each transform coefficient of the 2D array and positioning it at a position in a 1D vector according to a scatter scan pattern based on the probability rank determined for its position in the 2D array as described above. The further encoding may include entropy encoding as described previously. A series of 1D arrays formed from 2D arrays of transform coefficients corresponding to each block of a frame can be further encoded by an encoder, such as encoder 300, to form an encoded frame. The encoded block may be included in an encoded video bitstream at step 510, generally with other encoded blocks of the frame. Note that no additional bits must be included in the encoded video bitstream to indicate which scatter scan pattern was used to encode each block of the frame. Which scatter scan pattern was used to encode each block of the frame may be identified by examination of bits that indicate, e.g., the block size, the prediction mode used to predict the block and the transform mode used to transform the block, thereby eliminating the need to add bits to the encoded video bitstream to identify the scatter scan pattern explicitly. At step 512, the encoded video bitstream can be stored using storage devices described above in relation to FIG. 1 or transmitted for decoding and subsequent viewing.

Figure 6:
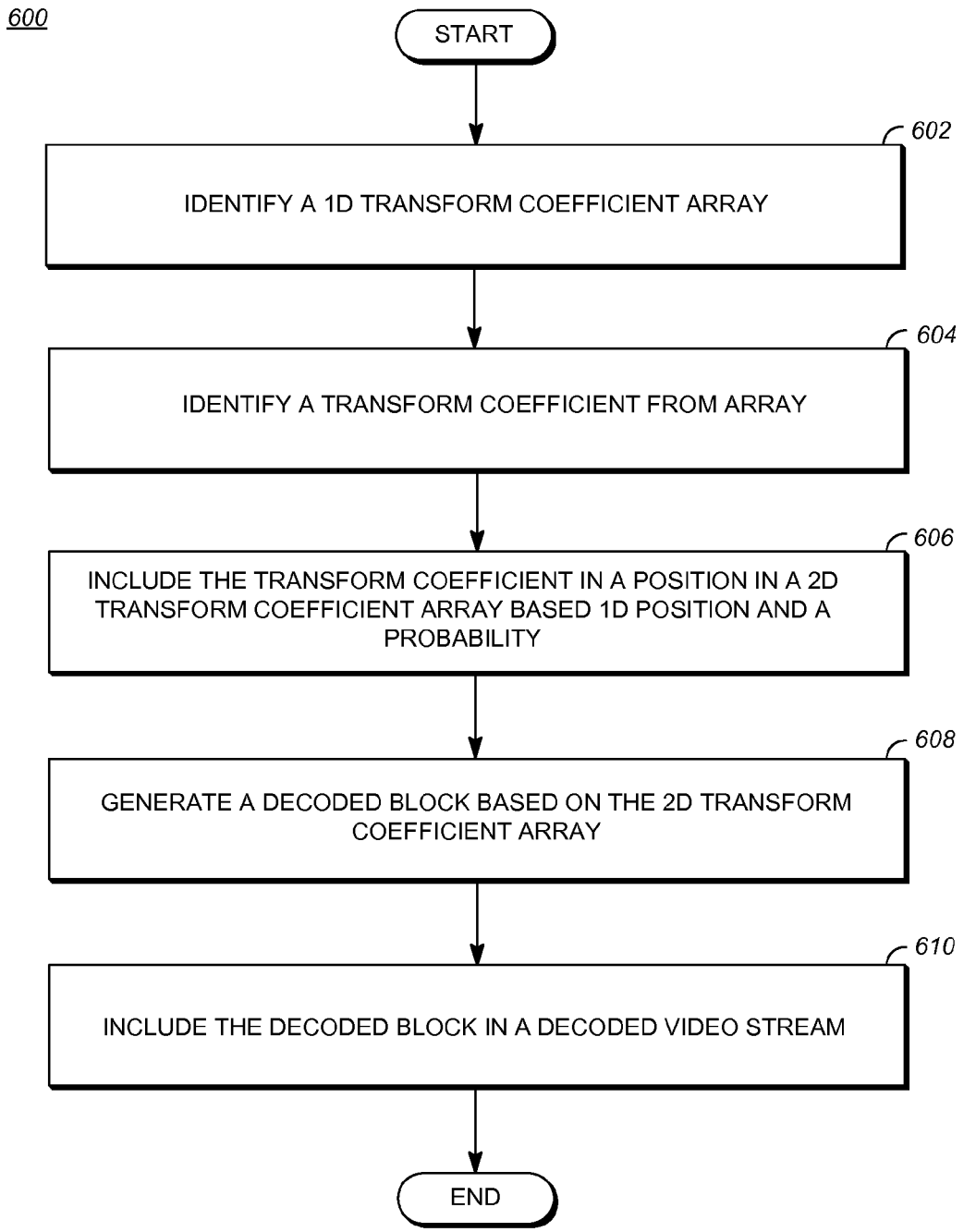
FIG. 6 is a flow diagram of a process for decoding blocks of frames of an encoded video bitstream in accordance with an implementation of this disclosure.

FIG. 6 is a flow diagram of a process 600 for decoding blocks of frames of an encoded video bitstream in accordance with an implementation of this disclosure. Process 600 is also referred to as a method of operation and can be implemented in a decoder such as decoder 400. Process 600 can be implemented, for example, as a software program that can be executed by computing devices such as transmitting station 102 or receiving station 110. The software program may include machine-readable instructions that can be stored in a memory such as memory 106 or memory 114, and that can be executed by a processor, such as CPU 104, to cause the computing device to perform process 600.

Process 600 can be implemented using specialized hardware or firmware. Some computing devices can have multiple memories, multiple processors, or both. The steps of process 600 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps. For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Process 600 assumes that a bitstream of video data having multiple frames, each having multiple blocks, is being encoded using a video encoder such as video encoder 300 executing on a computing device such as transmitting station 102. The video data or bitstream can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder. At least some of the blocks within frames are entropy coded using transform coefficients as described in more detail below.

At step 602, process 600 can identify a 1D transform coefficient array including plurality of transform coefficients for a block of a frame of the encoded video bitstream. By identify, we can mean determine, calculate, select, distinguish or other identify in any manner whatsoever. This can occur during decoding a block of a frame of the encoded video bitstream. The encoded video bitstream can include partitions that include encoded blocks. The encoded blocks can be, for example, entropy decoded as described in relation to step 402 of FIG. 4. Following entropy decoding, the plurality of transform coefficients can be included in a 1D array.

At step 604, process 600 can identify a transform coefficient from the plurality of transform coefficients. This step indicates that each transform coefficient in the 1D array may be processed individually. In operation, a decoder may access the transform coefficients in order from the beginning of the 1D array to the end, identifying each transform coefficient in the 1D array. Once identified, the transform coefficient is included in a 2D array representing the block to be further decoded at step 606. The position at which the identified transform coefficient is included in the 2D array is based on the position of the transform coefficient in the 1D array and a probability of the transform coefficient having a zero or non-zero value. If the probability is associated with a zero value, the sequence would remain the same based on arranging the probabilities in increasing order, instead of decreasing order. Step 606 may be performed by using the scatter scan pattern selected from one or more scatter-based scan tables described with respect to FIG. 5. As mentioned above, the scatter-based scan table(s) may be included in both the encoder and decoder before encoding and decoding video streams to eliminate the need to send the tables in the encoded video bitstream.

At the time a decoder receives an encoded video stream, bits included in the encoded video bitstream (e.g., in frame, partition or block headers) can indicate block size, prediction mode and/or transform mode. These values may be used as indices to select which scatter scan pattern within a scatter-based scan table was used to encode the block and therefore which scatter scan pattern to use to decode the block. Referring to FIG. 10, when the block to be decoded is a 4×4 block transformed using the third combination of transforms, in this example DCT/ADST, the scatter-based scan table would indicate 1D array 1004 as the sequence of the transform coefficients.

FIG. 18 is a diagram of a two-dimensional array 1800 generated using the one-dimensional array 1004 of FIG. 10C. As seen therein, the first transform coefficient of 1D array 1004 is included at position (0,0) of 2D array 1800, the second transform coefficient of 1D array 1004 is included at position (1,0) of 2D array 1800, the third transform coefficient of 1D array 1004 is included at position (2,0) of 2D array 1800, the fourth transform coefficient of 1D array 1004 is included at position (0,1) of 2D array 1800 and so on. While not applicable in this example, the 1D array formed for the block to be encoded may be compressed by eliminating trailing zeros through the use of an EOB token described above. In such a case, the 1D array would have fewer values than the number of values in the 2D array that it is being arranged into using the scatter scan pattern. Since the trailing values are all zeros, after arranging all of the available values of the 1D array into the 2D array, any unfilled positions in the 2D array may be set to zero. This may simplify processing of an encoded block if an EOB token is detected.

Returning to FIG. 6, process 600 generates a decoded block at step 608 based on the 2D transform coefficient array formed at step 606. By generate, we can mean develop, form, calculate, make, introduce or in any manner whatsoever generate. The 2D transform coefficient array formed at step 608 with transform coefficients restored to the positions at which they were originally placed when the 2D array was transformed and quantized by an encoder. In general, the decoded block may be generated by de-quantizing the transform coefficients (if originally quantized), inverse transforming the resulting 2D array to form, e.g., a residual, forming a prediction block for the current block and adding the prediction block to the residual to form the decoded current block. Following entropy decoding and scanning to arrange the series of 1D arrays representing each block of a frame into 2D arrays, the blocks of the frame can be further decoded as described in relation to FIG. 4 to form a decoded frame.

At step 610, the decoded block and frame can be included in a decoded video stream. By include we can mean add, append, combine, incorporate or otherwise include in any manner whatsoever. The decoded video stream can be viewed or stored for later viewing or processing.

The patterns of non-zero coefficient probabilities represented in FIGS. 8A, 9A, 10A and 11-17 reveal at least one reason scatter scan patterns group zero coefficients more efficiently than sequential scan orders. That is, the distribution of non-zeroes around the DC coefficient is not based on a straight line from edge to edge around the DC coefficient. Rather, the distribution is a radial curve around the DC coefficient. Looking at FIG. 17, for example, the contour formed by the positions having a 1% probability of being non-zero versus positions having 0% probability of being non-zero starts at the $23^{rd}$ position along the top row of values and proceeds in an arc to the $32^{nd}$ position on the left-hand column. Raster-based scan orders, including zig-zag, column and row, all traverse the 2D array in basically straight lines, either along rows and columns or diagonally (zig-zag). In contrast, scatter scan patterns disclosed herein are capable of tracking any arrangement of probabilities to insure that coefficients having a low probability of being non-zero are all properly grouped regardless of the distribution of probabilities in the 2D array. Accordingly, over a number of blocks, the number of explicitly coded zero coefficients (that is, those before the EOB token) is reduced as compared to a raster-based scan order. It is also worth noting that, in all examples, vertical correlation (and thus "zero-ness") is less than horizontal, thus the scatter-based scan tables have a slight vertical over horizontal bias in the resulting scan order.

By arranging transform coefficients into a 1D array for ordering within an encoded bitstream, there is an increased probability that the largest number of zero coefficients is grouped together at the end of the 1D array. In this way, the compression of a frame according to the teachings herein may be increased by maximizing the zero coefficients located before the EOB token, thus minimizing the zero coefficients located before the EOB token that need to be explicitly coded.

It is useful to note that, while the scan table is described generally as a table with entries corresponding to 1D arrays of transform coefficients with index values based on the transform size, etc., this is not necessary. Each 1D array may be stored as a separate scan table in the form of 2D array in raster-scan order that provides the position of the coefficient in the array. For example, 1D array 804 may be stored as 2D array 806 as shown in FIG. 8D.

One method and apparatus for encoding a video stream includes, for example, identifying a two-dimensional (2D) transform coefficient array including a plurality of transform coefficients corresponding to a block of a frame of the video stream, identifying a transform coefficient from the plurality of transform coefficients, including the transform coefficient in a one-dimensional (1D) transform coefficient array at a 1D array position based on 2D array position of the transform coefficient in the 2D transform coefficient array and a probability associated with the 2D array position, wherein the probability is based on one or more video streams other than the video stream, generating an encoded block based on the 1D transform coefficient array, and including the encoded block in an encoded video stream.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 110 (and the algorithms, methods, instructions, etc., stored thereon and/or executed thereby, including by encoder 300 and decoder 400) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 110 do not necessarily have to be implemented in the same manner.

Further, in one aspect, for example, transmitting station 102 or receiving station 110 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 102 and receiving station 110 can, for example, be implemented on computers in a video conferencing system. Alternatively, transmitting station 102 can be implemented on a server and receiving station 110 can be implemented on a device separate from the server, such as a hand-held communications device. In this instance, transmitting station 102 can encode content using an encoder 300 into an encoded video signal and transmit the encoded video signal to the communications device. In turn, the communications device can then decode the encoded video signal using a decoder 400. Alternatively, the communications device can decode content stored locally on the communications device, for example, content that was not transmitted by transmitting station 102. Other suitable transmitting station 102 and receiving station 110 implementation schemes are available. For example, receiving station 110 can be a generally stationary personal computer rather than a portable communications device and/or a device including an encoder 300 may also include a decoder 400.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding an encoded video stream, comprising:
    identifying a one-dimensional (1D) transform coefficient array including a plurality of transform coefficients corresponding to a block of a frame of the encoded video stream;
    identifying a transform coefficient from the plurality of transform coefficients;
    including the transform coefficient in a two-dimensional (2D) transform coefficient array at a 2D array position based on a 1D array position of the transform coefficient in the 1D transform coefficient array and a probability associated with the 2D array position, wherein the probability is based on one or more video streams other than the encoded video stream;
    generating a decoded block based on the 2D transform coefficient array; and
    including the decoded block in a decoded video stream.

2. The method of claim 1 wherein the transform coefficient is a first transform coefficient, the 2D array position is a first 2D array position, the 1D array position is a first 1D array position, and the probability is a first probability, the method further comprising:
    identifying a second transform coefficient from the plurality of transform coefficients; and
    including the second transform coefficient in the 2D transform coefficient array at a second 2D array position based on a second 1D array position of the second transform coefficient in the 1D transform coefficient array and a second probability associated with the second 2D array position, wherein the second probability is based on one or more video streams other than the encoded video stream, and wherein a first distance between the second 1D array position and the first 1D array position is less than two and a second distance between the second 2D array position and the first 2D array position is at least two.

3. The method of claim 2, further comprising:
    identifying a third transform coefficient from the plurality of transform coefficients; and
    including the third transform coefficient in the 2D transform coefficient array at a third 2D array position based on a third 1D array position of the third transform coefficient in the 1D transform coefficient array and a third probability associated with the third 2D array position, wherein the third probability is based on one or more video streams other than the encoded video stream, and wherein a third distance between the third 1D array position and the first 1D array position is less than two and a fourth distance between the third 2D position and the first 2D array position is at least two.

4. The method of claim 1 wherein identifying the 1D transform coefficient array comprises selecting a 1D array from a plurality of 1D arrays, the 1D array assigning each 2D array position to a respective position in the 1D transform coefficient array based on the probability, and wherein each of the plurality of 1D arrays is associated with a transform size and a transform type.

5. The method of claim 4 wherein each 1D array of the plurality of 1D arrays is generated by:
   selecting blocks of the one or more video streams having a respective transform size and generated using a respective transform type;
   calculating a probability associated with a respective 2D array position of the blocks that the value of a transform coefficient at the respective 2D array position is one of zero or non-zero; and
   assigning each 2D array position to positions in a respective 1D array based on a value of the calculated probability.

6. The method of claim 5 wherein calculating the probability comprises calculating a probability that the value of a transform coefficient at the respective 2D array position is non-zero; and wherein assigning each 2D array position to the positions in the respective 1D array based on the value of the calculated probability comprises assigning each 2D array position in an order of decreasing value of the calculated probability.

7. The method of claim 1 wherein generating the decoded block based on the 2D transform coefficient array comprises:
   de-quantizing values of the 2D transform coefficient array using a quantization value to obtain a de-quantized transform block;
   inverse transforming the de-quantized transform block to obtain a residual block;
   generating a prediction block associated with the residual block; and
   adding the prediction block to the residual block to generate the decoded block.

8. The method of claim 7 wherein transform coefficients in the 1D transform coefficient array are arranged in a sequence from a highest value for the probability to a lowest value for the probability.

9. The method of claim 1 wherein the probability is a probability associated with an expected value of the transform coefficient located at the 2D array position.

10. The method of claim 1 wherein the plurality of transform coefficients is a plurality of quantized transform coefficients of a residual block generated by:
    forming a prediction block for a block to be encoded using a prediction mode;
    generating the residual block based on a difference between the prediction block and the block to be encoded;
    transforming the residual block based on a transform type and a transform size; and
    quantizing the transformed residual block; and
    wherein identifying the 1D transform coefficient array comprises:
    selecting encoded data from the encoded video stream representing the residual block; and
    entropy decoding the encoded data to recreate the plurality of quantized transform coefficients as the 1D transform coefficient array.

11. An apparatus for decoding an encoded video stream, comprising:
    non-transitory computer-readable storage medium; and
    a processor configured to execute a computer program stored in the non-transitory computer-readable storage medium to:
    identify a one-dimensional (1D) transform coefficient array including a plurality of transform coefficients corresponding to a block of a frame of the encoded video stream;
    identify a transform coefficient from the plurality of transform coefficients;
    include the transform coefficient in a two-dimensional (2D) transform coefficient array at a 2D array position based on a 1D array position of the transform coefficient in the 1D transform coefficient array and a probability associated with the 2D array position, wherein the probability is based on one or more video streams other than the encoded video stream;
    generate a decoded block based on the 2D transform coefficient array; and
    include the decoded block in a decoded video stream.

12. The apparatus of claim 11 wherein the transform coefficient is a first transform coefficient, the 2D array position is a first 2D array position, the 1D array position is a first 1D array position, and the probability is a first probability, and the processor is configured to:
    identify a second transform coefficient from the plurality of transform coefficients; and
    include the second transform coefficient in the 2D transform coefficient array at a second 2D array position based on a second 1D array position of the second transform coefficient in the 1D transform coefficient array and a second probability associated with the second 2D array position, wherein the second probability is based on one or more video streams other than the encoded video stream, and wherein a first distance between the second 1D array position and the first 1D array position is less than two and a second distance between the second 2D array position and the first 2D array position is at least two.

13. The apparatus of claim 12 wherein the processor is configured to:
    identify a third transform coefficient from the plurality of transform coefficients; and
    include the third transform coefficient in the 2D transform coefficient array at a third 2D array position based on a third 1D array position of the third transform coefficient in the 1D transform coefficient array and a third probability associated with the third 2D array position, wherein the third probability is based on one or more video streams other than the encoded video stream, and wherein a third distance between the third 1D array position and the first 1D array position is less than two and a fourth distance between the third 2D position and the first 2D array position is at least two.

14. The apparatus of claim 11 wherein the probability is based on a transform type and a transform size of the block.

15. The apparatus of claim 11 wherein the probability associated with the 2D array position is a probability that a transform coefficient located at the 2D array position is non-zero.

16. The apparatus of claim 11 wherein the probability is a probability associated with an expected value of the transform coefficient located at the 2D array position.

17. The apparatus of claim 16 wherein transform coefficients in the 1D transform coefficient array are arranged in a sequence from a highest value for the probability to a lowest value for the probability or from a lowest value for the probability to the highest value for the probability.

18. The apparatus of claim 11 wherein the plurality of transform coefficients is a plurality of quantized transform coefficients of a residual block generated by:
   forming a prediction block for a block to be encoded using a prediction mode;
   generating the residual block based on a difference between the prediction block and the block to be encoded;
   transforming the residual block based on a transform type and a transform size; and
   quantizing the transformed residual block; and
   wherein the processor is configured to identify the 1D transform coefficient array by:
   selecting encoded data from the encoded video stream representing the residual block; and
   entropy decoding the encoded data to recreate the plurality of quantized transform coefficients as the 1D transform coefficient array.

19. The apparatus of claim 18 wherein the probability is based on the transform type and the transform size.

20. A method for decoding an encoded video stream, comprising:
   identifying a one-dimensional (1D) transform coefficient array including a plurality of transform coefficients corresponding to a block of a frame of the encoded video stream;
   identifying a first transform coefficient from the plurality of transform coefficients;
   including the first transform coefficient in a two-dimensional (2D) transform coefficient array at a first 2D array position based on a first 1D array position of the first transform coefficient in the 1D transform coefficient array and a first probability associated with the first 2D array position, wherein the first probability is based on one or more video streams other than the encoded video stream;
   identifying a second transform coefficient from the plurality of transform coefficients;
   including the second transform coefficient in the 2D transform coefficient array at a second 2D array position based on a second 1D array position of the second transform coefficient in the 1D transform coefficient array and a second probability associated with the second 2D array position, wherein the second probability is based on one or more video streams other than the encoded video stream, and wherein a first distance between the second 1D array position and the first 1D array position is less than two and a second distance between the second 2D array position and the first 2D array position is at least two;
   identifying a third transform coefficient from the plurality of transform coefficients;
   including the third transform coefficient in the 2D transform coefficient array at a third 2D array position based on a third 1D array position of the third transform coefficient in the 1D transform coefficient array and a third probability associated with the third 2D array position, wherein the third probability is based on one or more video streams other than the encoded video stream, and wherein a third distance between the third 1D array position and the first 1D array position is less than two and a fourth distance between the third 2D position and the first 2D array position is at least two;
   generating a decoded block based on the 2D transform coefficient array; and
   including the decoded block in a decoded video stream; wherein the first probability is a probability that a transform coefficient located at the first 2D array position is one of zero or non-zero and the second probability is a probability that a transform coefficient located at the second 2D array position is the one of zero or non-zero.

* * * * *